US010279547B2

(12) United States Patent
Xu et al.

(10) Patent No.: US 10,279,547 B2
(45) Date of Patent: May 7, 2019

(54) DEVICE AND METHOD OF FORMING DECORATIVE PANEL

(71) Applicant: FORD GLOBAL TECHNOLOGIES, LLC, Dearborn, MI (US)

(72) Inventors: Tom Xu, Nanjing (CN); Gary D. Mullen, Plymouth, MI (US); Peter Zhang, Nanjing (CN); Stephen Zhou, Nanjing (CN); Frank Hu, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 14/806,705

(22) Filed: Jul. 23, 2015

(65) Prior Publication Data

US 2016/0052213 A1   Feb. 25, 2016

(30) Foreign Application Priority Data

Aug. 21, 2014 (CN) .......................... 2014 1 0415549

(51) Int. Cl.
*B29C 69/00* (2006.01)
*B23K 26/38* (2014.01)
(Continued)

(52) U.S. Cl.
CPC ............ *B29C 69/001* (2013.01); *B23K 26/38* (2013.01); *B26F 1/02* (2013.01); *B26F 1/14* (2013.01); *B26F 2001/4418* (2013.01); *B26F 2001/4427* (2013.01); *B29C 2793/009* (2013.01); *B29K 2023/12* (2013.01); *B29K 2309/08* (2013.01); *B29L 2031/3041* (2013.01)

(58) Field of Classification Search
CPC . B29C 69/001; B29C 43/40; B29C 2043/403; B29C 2043/406; B26F 1/02; B26F 1/04; B26F 1/06; B26F 1/08; B26F 1/10; B26F 1/14; B26F 2001/4418; B26F 2001/4427
USPC .......................................... 264/154–156, 161
See application file for complete search history.

(56) References Cited

U.S. PATENT DOCUMENTS 2,286,117 A * 6/1942 Sidnell ................ B29C 33/0033
                                                                    264/154
2,348,335 A * 5/1944 Escher .................... B44C 1/221
                                                                    101/128.1
(Continued)

FOREIGN PATENT DOCUMENTS

CN           2102197 U      4/1992
CN           1822938 A      8/2006
(Continued)

*Primary Examiner* — Atul P. Khare
(74) *Attorney, Agent, or Firm* — Alica Xu; Kolitch Romano, LLP

(57) ABSTRACT

The present invention in one or more embodiments provides a method of forming an opening on a panel, the method including pressing in a first direction on the panel to form a protrusion with a tip portion, and cutting the protrusion with a force in a second direction to remove the tip portion to form the opening on the panel, the second direction being different from the first direction. The first direction may be a direction of gravity plus and minus up to 15 degrees. The second direction may be transverse to the first direction with an angle differential there-between of 75 to 105 degrees.

8 Claims, 3 Drawing Sheets

(51) Int. Cl.
  *B26F 1/02*       (2006.01)
  *B29C 53/02*       (2006.01)
  *B29K 23/00*       (2006.01)
  *B29L 31/30*       (2006.01)
  *B29K 309/08*      (2006.01)
  *B26F 1/44*        (2006.01)
  *B26F 1/14*        (2006.01)

(56) References Cited

U.S. PATENT DOCUMENTS

| | | | | |
|---|---|---|---|---|
| 3,704,194 | A * | 11/1972 | Harrier | B29C 33/0033 |
| | | | | 156/245 |
| 3,846,218 | A * | 11/1974 | Wooten | B65D 65/38 |
| | | | | 156/252 |
| 3,881,489 | A * | 5/1975 | Hartwell | A61F 13/5146 |
| | | | | 428/137 |
| 4,247,511 | A | 1/1981 | Sutton et al. | |
| 4,276,336 | A * | 6/1981 | Sabee | B26F 1/24 |
| | | | | 264/154 |
| 4,391,037 | A * | 7/1983 | Giasini | B21C 47/247 |
| | | | | 29/21.1 |
| 4,886,632 | A * | 12/1989 | Van Iten | A61F 13/15577 |
| | | | | 156/252 |
| 5,076,498 | A * | 12/1991 | Townsend | A01G 25/02 |
| | | | | 138/42 |
| 5,078,948 | A * | 1/1992 | Troutman | B29C 49/60 |
| | | | | 264/154 |
| 5,738,816 | A * | 4/1998 | Tidemann | H05K 13/0417 |
| | | | | 264/151 |
| 6,277,464 | B1 * | 8/2001 | Ronan | B01D 39/14 |
| | | | | 264/156 |
| 6,837,956 | B2 * | 1/2005 | Cowell | A61F 13/15707 |
| | | | | 156/252 |
| 8,182,728 | B2 * | 5/2012 | Cree | A61F 13/537 |
| | | | | 264/154 |
| 8,555,506 | B2 | 10/2013 | Bocaccio et al. | |
| 9,067,334 | B2 * | 6/2015 | Cree | A61F 13/512 |
| 2007/0227217 | A1 * | 10/2007 | Halamoda | B26F 1/24 |
| | | | | 72/71 |

FOREIGN PATENT DOCUMENTS

| | | |
|---|---|---|
| CN | 101412226 | 4/2009 |
| CN | 102886422 | 1/2013 |
| CN | 103407502 | 11/2013 |
| EP | 1649990 A1 | 4/2006 |
| SU | 642053 A1 | 1/1979 |

* cited by examiner

DEVICE AND METHOD OF FORMING DECORATIVE PANEL

RELATED APPLICATION(S)

This application claims the benefit of Chinese New Invention Patent Application No.: CN201410415549.7, filed Aug. 21, 2014, the entire contents thereof being incorporated herein by reference.

TECHNICAL FIELD

The present invention relates to a device and a method of forming a decorative panel.

BACKGROUND

One or more rear window decorative panels may be positioned between a vehicle rear seat and a vehicle trunk in consideration for vehicle interior functionality. The rear window decorative panel are often formed of glass fiber reinforced polypropylene (PP) composite materials for cost efficiencies.

In certain existing designs, a number of breather holes may be formed by directly punching on the decorative panel over a punching die during molding. However, the thus-formed decorative panel may often be over-stretched during the punching process, and unpleasant stress edges may result. Chinese patent application publication CN103407502A discloses a PP honeycomb panel, where periphery seal is used around the PP panel in an effort to reduce stress edges.

Another solution in the industry is to cover the breather holes on the decorative panel to conceal the stress edge.

SUMMARY

One or more advantageous features as described herein are believed to be readily apparent from the following detailed description of one or more embodiments when taken in connection with the accompanying drawings.

In one or more embodiments, a method of forming an opening on a panel includes pressing in a first direction on the panel to form a protrusion with a tip portion, and cutting the protrusion with a force in a second direction to remove the tip portion to form the opening on the panel, the second direction being different from the first direction. The first direction may be a direction of gravity plus and minus up to 15 degrees. The second direction may be transverse to the first direction with an angle differential there-between of 75 to 105 degrees.

The pressing may be carried out with a punching die including first and second die halves, the second die half including a cavity to at least partially receive the first die half. The pressing may be carried out by placing the panel between the first and second die halves. The cutting may be carried out by applying laser to remove the tip portion.

The protrusion may be provided with a first depth in the first direction and the tip portion may be provided with a second depth in the first direction, the second depth being smaller than the first depth.

The method may further include subjecting under a second force a wall of the protrusion remaining after the tip portion being removed, the wall being bent away from the opening under the second force.

In another or more embodiments, a punching die is provided for forming openings on a decorative panel, the punching die includes a first die half with a number of die protrusions, and a second die half with a number of die cavities each to at least partially receive one of the number of die protrusions, the number of cavities corresponding to the number of openings on the decorative panel.

At least two of the number of die protrusions may be of different cross-sectional shapes. At least two of the number of die cavities may be of different cross-sectional shapes. At least one of the number of die protrusions may include a piercing tip to create a piercing hole on the decorative panel upon contact. At least two of the number of die protrusions may be of different depth differentials relative to their corresponding die cavities.

BRIEF DESCRIPTION OF THE DRAWINGS

Reference is now made to the one or more embodiments illustrated in greater detail in the accompanying drawings and described below wherein.

DETAILED DESCRIPTION OF ONE OR MORE EMBODIMENTS

Figure 1:
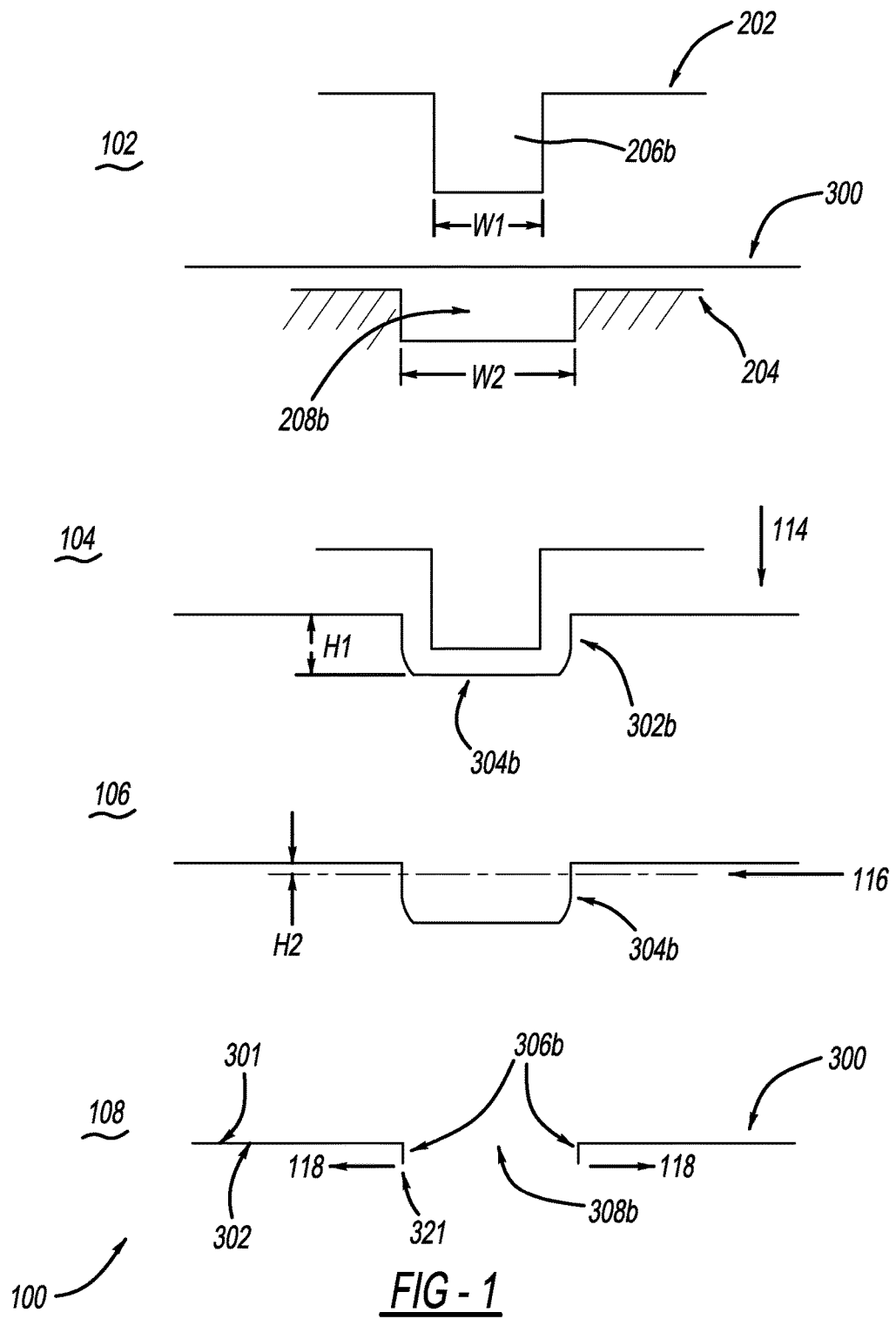
FIG. 1 illustratively depicts a process flow of creating one or more openings on a panel according to one or more embodiments of the present invention.
Figure 2:
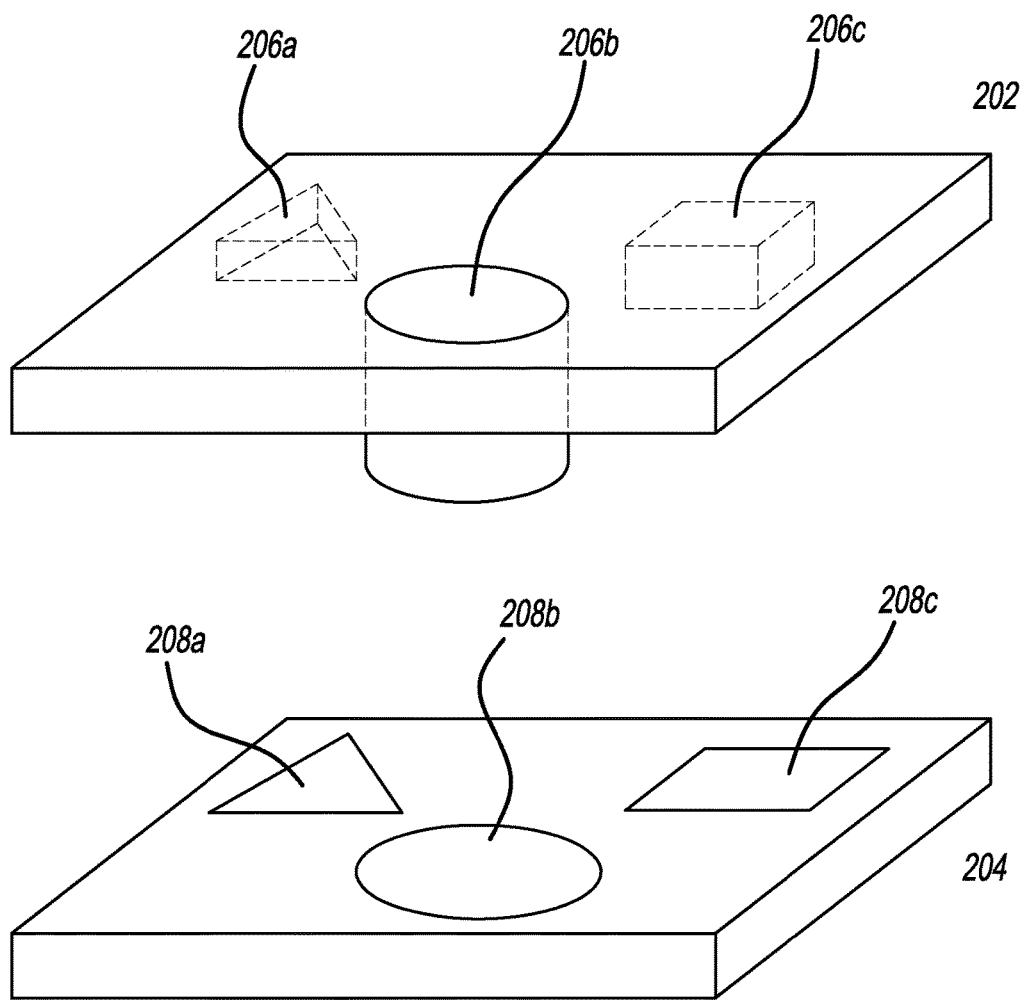
FIG. 2 illustratively depicts a perspective view of a punching die for carrying out the process referenced in FIG. 1.

As referenced in the FIGS., the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

The present invention in one or more embodiments is advantageous in providing a method of forming openings in a panel without necessarily introducing stress edges otherwise often encountered in some of the existing methods and designs. Accordingly, the present invention in one or more embodiments provides a cost effective way to forming openings on the panel with visually appealing edge effects.

As illustratively depicted in FIG. 1-4, a method generally shown at 100 in view of 400 is provided for creating one or more openings on a panel 300 via a punching die generally at 200. Referring back to FIG. 2, the punching die 200 includes a first die half 202 with a number of die protrusions or punching heads 206a, 206b, 206c collectively referred to as die protrusions 206, and a second die half 204 with a number of die cavities 208a, 208b, 208c collectively referred to as die cavities 208. In one or more embodiments, the number of die protrusions 206 corresponds to the number of cavities 208 in quantity, shape and location. The number of die protrusions 206 and the number of cavities 208 may be of any suitable shapes such as circular, triangle and polygon. For instance, and as illustratively depicted in FIG. 2, the die protrusions 206 may include one die protrusion 206a with a cross-section generally of a triangle, one die protrusion 206c with a cross-section generally of a rectangle, and another die protrusion 206b with a cross-section generally of a circle.

Furthermore, at least two of the number of the die protrusions 206 may be of two different cross-section shapes dependent upon a particular design need at hand, and at least of two of the die cavities 206 may also be of different cross-section shapes.

In one or more embodiments, each of the number of die protrusions 206 corresponds to each of the number of die cavities 208 in cross-sectional shape. During the forming process, each of the number of die cavities 208 at least partially receives each of the number of die protrusions 206.

As mentioned herein elsewhere, the punching die 200 may be used to carry out the method shown in FIG. 1. At step 102 and in view of step 402, the punching die 200 is provided to include the first die half 202, the second die half 204 and the panel 300. The panel 300 is placed between the first die half 202 and the second die half 204 and supported on the second die half 204. Each of the number of die protrusions 206 is aligned with each of the number of the cavities 208. For brevity, only one of the die protrusions 206b and one corresponding cavity 208b are illustratively depicted. As mentioned herein elsewhere, the present invention in one or more embodiments advantageously provides a method of creating one or more openings on a panel with reduced or diminished generation of unwanted stress edges associated with certain panel materials. Accordingly this inventive method favorably broadens design window for these panels and their openings. In particular, the panel 300 may include and may be formed of stress-prone polymeric materials such as polypropylene and glass fibers, while taking the advantage of them being cost effective.

At step 104 and in view of step 404, the first die half 202 moves in a first direction 114 or a thickness direction, for instance but not limited to a direction of gravity, toward the panel 300 along with the die protrusion 206b. The first direction 114 may be a direction of the gravity plus or minus up to 15 degrees. During the movement, the die protrusion 206b presses or punches the panel 300 under certain predetermined force and speed along the first direction 114 to form a protrusion 302b.

The outer periphery of the die protrusion 206b is spaced apart with a distance W2-W1 from a corresponding inner periphery of the die cavity 208b, with non-limiting size range thereof being 3 to 8 millimeters, so as to prevent the punching die 200 from directly slicing out the protrusion 302b and exposing the stress edges around its edges. The protrusion 302b is of a height H1 along the first direction 114. In one or more embodiments, the protrusion 302b includes a tip portion 304b with a closed end.

However, in certain other embodiments, the tip portion 304b may also include a through hole (not shown). This may be carried out by equipping the die protrusion 206b with a sharp and pointy end (not shown). The pointy end firstly pierces through the panel 300 and creates a small hole, as the first die half 202 continues to move along the first direction 114, the small hole gradually increases in size of its opening, while the panel 300 is pressed to form the protrusion 302b. Stretch stress is thus beneficially reduced via the employment of the through hole on the protrusion 302b. This is even so when the die protrusion 206b must move toward the panel with relatively greater speed. Moreover, production efficiency may be improved with the increases in the forming speed.

At step 106 and in view of step 406, cutting the protrusion 302b at a predetermined position such as a location with a distance H2 from the panel 300, along a second direction 116 or a surface direction, for instance but not limited to a direction transverse to the first direction 114, to remove the tip portion 304b. Accordingly, the tip portion 304b is of a height H1-H2 along the first direction 114. In another or more embodiments, the second direction 116 may be transverse to the first direction 114 with a suitable angle, and thus not necessarily perpendicular to the first direction 114. Cutting may be carried out via laser cutting and die cutting or any other suitable methods.

At step 108 and in view of step 408, the panel 300 is depicted with the tip portion 304b removed per the step 106 and a resultant opening 308b. Thus finalized or finished decorative panel 300 includes the opening 308b and a wall 306b surround the opening 308b and extending along the first direction 114. The wall 306b is of a height H2, with a non-limiting range thereof being 0.5 to 10 millimeters. The panel 300 thus formed includes a first surface 301 that is readily visible to the user and a second surface 302 opposing the first surface 301 so as not to be readily visible to user. The wall 306b is in material continuity with the first surface 301 and includes an end surface 321 along the first direction 114. The wall 306b may further be processed to bend toward a direction 118 so as to make invisible at least a portion of the wall 306b, particularly to make the portion of 306b relatively closer to the end surface 321, such that the opening 308b may be presented with relatively greater smoothness when viewed from the first surface 301. The wall 306b is positioned spaced apart from the first surface 301, and the end surface 321 is positioned opposite from the first surface 301 along the first direction 114, such that any possible stress edges are therefore concealed. Therefore the panel 300 may be formed with enhanced visual appeal and with desirable cost efficiencies.

Figure 3:
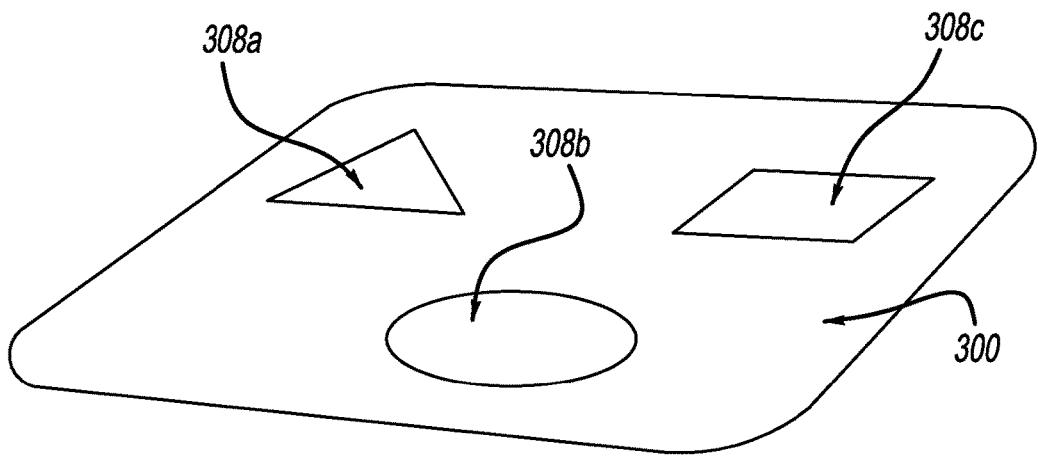
FIG. 3 illustratively depicts a perspective view of the panel formed according to the process referenced in FIG. 1.
Figure 4:
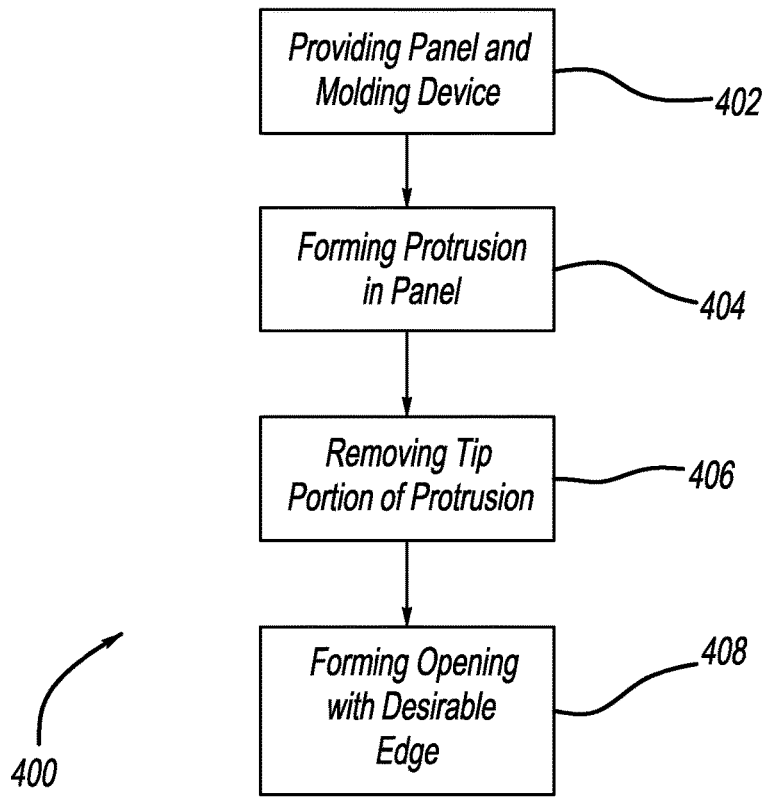
FIG. 4 illustratively depicts a flowchart summarizing at least some of the steps referenced in FIG. 1.

In view of FIG. 3, the finished panel 300 includes a number of openings, such as 308a, 308b and 308c. The punching die 200 of the present invention in one or more embodiments may cut in a single pass to form a number of protrusions including for instance the protrusion 302b, and to form a number of openings such as 308a through 308c, all with reduced or eliminated stress edges. Accordingly the forming process may be simplified and production efficiency may be greatly enhanced.

The protrusion 302b with height H1 is illustratively depicted in details according to the present invention in one or more embodiments. However, it is noted that in certain other embodiments a number of protrusion such as 302b may be of different heights, for instance, the number of die protrusions such as 206b may be of different height. Further, it is contemplated that a number of protrusions such as 302b with different height may be formed on the panel 300 via a single cutting pass and some of the protrusions 302b may be cut at a predetermined height to create a number of openings such as 308a through 308c and a number of receiving portions, for instance uncut protrusions on another portion, so as to meet certain specific design needs.

In one or more embodiments, the present invention as set forth herein is believed to have overcome certain challenges associated with vehicle decorative panels faced by known production of decorative panel. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A method of forming an opening on a panel, the method comprising:
providing a punching die including first and second die halves, wherein the first die half includes a die protrusion having a sharp and pointy end and the second die half includes a cavity to at least partially receive the die protrusion of the first die half;

placing the panel between the first and second die halves;

pressing in a first direction on the panel to form a panel protrusion having a tip portion, said pressing including:
  piecing the panel with the sharp and pointy end to create a through hole in the tip portion, and
  continuing to move the first die half along the first direction to increase a size of the through hole while pressing the panel between the first and second die halves, the through hole formation reducing a stretch stress in the panel during said formation of the protrusion; and cutting the panel protrusion with a force applied in a second direction to remove the tip portion and form the opening on the panel, the second direction being different from the first direction, wherein a wall of the panel protrusion remains after said removing of the tip portion, and the remaining wall surrounds the opening and has a height, wherein the panel is made from polymeric material, and wherein the method further comprises bending the remaining wall toward a direction away from the opening so as to make invisible at least a portion of the remaining wall when the panel is viewed from a side of the panel opposite to the remaining wall.

2. The method of claim 1, wherein the first direction is a direction of gravity plus or minus up to 15 degrees.

3. The method of claim 2, wherein the second direction is transverse to the first direction with an angle differential therebetween of 75 to 105 degrees.

4. The method of claim 1, wherein the cutting is carried out by applying a laser to remove the tip portion.

5. The method of claim 1, wherein the height of the remaining wall is between 0.5 to 10 millimeters.

6. A method of forming an opening on a panel, the method comprising:

pressing in a first direction on the panel to form a panel protrusion having a tip portion;

cutting the panel protrusion with a force applied in a second direction to remove the tip portion and form the opening on the panel, the second direction being different from the first direction, wherein a wall of the panel protrusion surrounding the opening remains after said removing of the tip portion; and bending the remaining wall in a direction away from the opening so as to make invisible at least a portion of the remaining wall when the panel is viewed from a side of the panel opposite the remaining wall, thereby concealing a stress edge resulting from the formation of the protrusion, wherein the pressing is carried out with a punching die including first and second die halves, the first die half includes a die protrusion, the second die half includes a cavity to at least partially receive the die protrusion of the first die half, and the panel is placed between the first and second die halves for said pressing, wherein an outer periphery of the die protrusion is spaced apart with a distance from a corresponding inner periphery of the die cavity during said pressing to prevent the punch die from directly slicing out the protrusion and from exposing stress edges generated in the panel during said pressing, and wherein the panel is made from polymeric material.

7. The method of claim 6, wherein the distance is in a range of 3 to 8 millimeters.

8. The method of claim 6, wherein pressing the panel further comprises piecing the panel with a sharp and pointy end of the die protrusion to create a through hole in the tip portion and continuing to move the first die half along the first direction to gradually increase a size of the through hole, the through hole formation reducing a stretch stress generated in the panel during said formation of the protrusion.

* * * * *